US011113124B2

(12) United States Patent
Walters et al.

(10) Patent No.: US 11,113,124 B2
(45) Date of Patent: Sep. 7, 2021

(54) SYSTEMS AND METHODS FOR QUICKLY SEARCHING DATASETS BY INDEXING SYNTHETIC DATA GENERATING MODELS

(71) Applicant: CAPITAL ONE SERVICES, LLC, McLean, VA (US)

(72) Inventors: Austin Walters, Savoy, IL (US); Jeremy Goodsitt, Champaign, IL (US); Galen Rafferty, Mahomet, IL (US); Vincent Pham, Champaign, IL (US); Anh Truong, Champaign, IL (US); Kate Key, Effingham, IL (US); Reza Farivar, Champaign, IL (US); Mark Watson, Urbana, IL (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/409,745

(22) Filed: May 10, 2019

(65) Prior Publication Data

US 2020/0012662 A1    Jan. 9, 2020

Related U.S. Application Data

(60) Provisional application No. 62/694,968, filed on Jul. 6, 2018.

(51) Int. Cl.
*G06N 20/00* (2019.01)
*G06F 9/54* (2006.01)
(Continued)

(52) U.S. Cl.
CPC .............. *G06F 9/541* (2013.01); *G06F 8/71* (2013.01); *G06F 9/54* (2013.01); *G06F 9/547* (2013.01);
(Continued)

(58) Field of Classification Search
CPC .............................. G06T 7/251; G06N 3/0481
See application file for complete search history.

(56) References Cited

U.S. PATENT DOCUMENTS 6,269,351 B1\* 7/2001 Black .................. G06F 16/30
706/15
7,788,191 B2\* 8/2010 Jebara .................. G06T 9/00
706/12

(Continued)

OTHER PUBLICATIONS

Author: Kryuchin et al.; A parallel algorithm for selecting activation functions of an artificial network; Dec. 2011; pp. 5-9.\*

*Primary Examiner* — Usmaan Saeed
*Assistant Examiner* — David M Nafziger
(74) *Attorney, Agent, or Firm* — Finnegan, Henderson, Farabow, Garrett & Dunner, LLP

(57) ABSTRACT

Systems and methods for searching datasets and classifying datasets are disclosed. For example, a system may include one or more memory units storing instructions and one or more processors configured to execute the instructions to perform operations. The operations may include receiving a test dataset from a client device and generating a test data model output using a data model, based on the test dataset. The operations may include processing test data model output by implementing an encoding method, a factorizing method, and/or a vectorizing method. The operations may include retrieving a reference data model output from a dataset index, based on a reference dataset. The operations may include generating a similarity metric based on the reference data model output and the test data model output. The operations may include classifying the test dataset based on the similarity metric and transmitting, to the client device, information comprising the classification.

18 Claims, 7 Drawing Sheets

(51) Int. Cl.

| | |
|---|---|
| G06F 17/16 | (2006.01) |
| G06N 3/04 | (2006.01) |
| G06F 11/36 | (2006.01) |
| G06N 3/08 | (2006.01) |
| G06F 21/62 | (2013.01) |
| G06N 5/04 | (2006.01) |
| G06F 17/15 | (2006.01) |
| G06T 7/194 | (2017.01) |
| G06T 7/254 | (2017.01) |
| G06T 7/246 | (2017.01) |
| G06F 16/2455 | (2019.01) |
| G06F 16/22 | (2019.01) |
| G06F 16/28 | (2019.01) |
| G06F 16/906 | (2019.01) |
| G06F 16/93 | (2019.01) |
| G06F 16/903 | (2019.01) |
| G06F 16/9038 | (2019.01) |
| G06F 16/9032 | (2019.01) |
| G06F 16/25 | (2019.01) |
| G06F 16/335 | (2019.01) |
| G06F 16/242 | (2019.01) |
| G06F 16/248 | (2019.01) |
| G06F 30/20 | (2020.01) |
| G06F 40/166 | (2020.01) |
| G06F 40/117 | (2020.01) |
| G06F 40/20 | (2020.01) |
| G06F 8/71 | (2018.01) |
| G06F 17/18 | (2006.01) |
| G06F 21/55 | (2013.01) |
| G06F 21/60 | (2013.01) |
| G06K 9/03 | (2006.01) |
| G06K 9/62 | (2006.01) |
| G06K 9/66 | (2006.01) |
| G06K 9/68 | (2006.01) |
| G06K 9/72 | (2006.01) |
| G06N 7/00 | (2006.01) |
| G06Q 10/04 | (2012.01) |
| G06T 11/00 | (2006.01) |
| H04L 29/06 | (2006.01) |
| H04L 29/08 | (2006.01) |
| H04N 21/234 | (2011.01) |
| H04N 21/81 | (2011.01) |
| G06N 5/00 | (2006.01) |
| G06N 5/02 | (2006.01) |

(52) U.S. Cl.
CPC ...... *G06F 11/3608* (2013.01); *G06F 11/3628* (2013.01); *G06F 11/3636* (2013.01); *G06F 16/2237* (2019.01); *G06F 16/2264* (2019.01); *G06F 16/248* (2019.01); *G06F 16/2423* (2019.01); *G06F 16/24568* (2019.01); *G06F 16/254* (2019.01); *G06F 16/258* (2019.01); *G06F 16/283* (2019.01); *G06F 16/285* (2019.01); *G06F 16/288* (2019.01); *G06F 16/335* (2019.01); *G06F 16/906* (2019.01); *G06F 16/9038* (2019.01); *G06F 16/90332* (2019.01); *G06F 16/90335* (2019.01); *G06F 16/93* (2019.01); *G06F 17/15* (2013.01); *G06F 17/16* (2013.01); *G06F 17/18* (2013.01); *G06F 21/552* (2013.01); *G06F 21/60* (2013.01); *G06F 21/6245* (2013.01); *G06F 21/6254* (2013.01); *G06F 30/20* (2020.01); *G06F 40/117* (2020.01); *G06F 40/166* (2020.01); *G06F 40/20* (2020.01); *G06K 9/036* (2013.01); *G06K 9/6215* (2013.01); *G06K 9/6218* (2013.01); *G06K 9/6231* (2013.01); *G06K 9/6232* (2013.01); *G06K 9/6253* (2013.01); *G06K 9/6256* (2013.01); *G06K 9/6257* (2013.01); *G06K 9/6262* (2013.01); *G06K 9/6265* (2013.01); *G06K 9/6267* (2013.01); *G06K 9/6269* (2013.01); *G06K 9/6277* (2013.01); *G06K 9/66* (2013.01); *G06K 9/6885* (2013.01); *G06K 9/72* (2013.01); *G06N 3/04* (2013.01); *G06N 3/0445* (2013.01); *G06N 3/0454* (2013.01); *G06N 3/08* (2013.01); *G06N 3/088* (2013.01); *G06N 5/00* (2013.01); *G06N 5/02* (2013.01); *G06N 5/04* (2013.01); *G06N 7/00* (2013.01); *G06N 7/005* (2013.01); *G06N 20/00* (2019.01); *G06Q 10/04* (2013.01); *G06T 7/194* (2017.01); *G06T 7/246* (2017.01); *G06T 7/248* (2017.01); *G06T 7/254* (2017.01); *G06T 11/001* (2013.01); *H04L 63/1416* (2013.01); *H04L 63/1491* (2013.01); *H04L 67/306* (2013.01); *H04L 67/34* (2013.01); *H04N 21/23412* (2013.01); *H04N 21/8153* (2013.01)

(56) References Cited

U.S. PATENT DOCUMENTS

| | | | | |
|---|---|---|---|---|
| 7,953,682 | B2* | 5/2011 | Smith | G09G 3/3216 |
| | | | | 706/25 |
| 8,548,951 | B2* | 10/2013 | Selmer | G06F 16/3347 |
| | | | | 707/661 |
| 2003/0074368 | A1* | 4/2003 | Schuetze | G06F 16/355 |
| 2011/0154109 | A1* | 6/2011 | Levine | G06F 11/0706 |
| | | | | 714/26 |
| 2013/0097103 | A1* | 4/2013 | Chari | G06N 20/00 |
| | | | | 706/12 |
| 2015/0066793 | A1* | 3/2015 | Brown | G06Q 30/00 |
| | | | | 705/325 |
| 2015/0241873 | A1* | 8/2015 | Goldenberg | G05B 19/41865 |
| | | | | 700/97 |
| 2018/0018585 | A1* | 1/2018 | Marin | G06N 20/20 |
| 2018/0122048 | A1* | 5/2018 | Wang | G06T 3/4053 |
| 2018/0264347 | A1* | 9/2018 | Tran | A63B 71/145 |
| 2018/0349742 | A1* | 12/2018 | Alekseevich | G06N 3/084 |
| 2019/0005657 | A1* | 1/2019 | Gao | G06K 9/6212 |
| 2019/0108396 | A1* | 4/2019 | Dal Mutto | G06T 7/174 |
| 2019/0147371 | A1* | 5/2019 | Deo | G06N 20/00 |
| | | | | 706/12 |
| 2019/0188260 | A1* | 6/2019 | Hewitt | G06F 40/253 |
| 2019/0220653 | A1* | 7/2019 | Wang | G06K 9/00268 |
| 2019/0220694 | A1* | 7/2019 | Biswas | G06K 9/6202 |
| 2019/0228037 | A1* | 7/2019 | Nicol | G06N 3/084 |
| 2019/0228310 | A1* | 7/2019 | Inagaki | G06K 9/6271 |
| 2019/0354802 | A1* | 11/2019 | Lin | G06K 9/4628 |
| 2019/0370666 | A1* | 12/2019 | Ros Sanchez | G06N 3/088 |
| 2019/0377849 | A1* | 12/2019 | Sha | G06N 3/088 |
| 2020/0192684 | A1* | 6/2020 | Woo | G06F 9/451 |
| 2020/0302292 | A1* | 9/2020 | Tseng | G06N 3/063 |
| 2020/0311572 | A1* | 10/2020 | Baker | G06N 3/0454 |

* cited by examiner

SYSTEMS AND METHODS FOR QUICKLY SEARCHING DATASETS BY INDEXING SYNTHETIC DATA GENERATING MODELS

CROSS REFERENCE TO RELATED APPLICATIONS

This application claims the benefit of U.S. Provisional Application No. 62/694,968, filed Jul. 6, 2018, the content of which is expressly incorporated herein by reference in its entirety.

BACKGROUND

The field of data management faces challenges for searching datasets to identify related datasets. In some cases, datasets may relate because they share overlapping data and/or they share similar statistical features or data schema (i.e., the organization of the data). Data-management systems may store or receive thousands, millions, or even more datasets. Such large-scale data management creates problems in efficiently and effectively identifying related datasets.

Datasets may be related in ways that are difficult to determine. For example, datasets may share some data but contain some non-overlapping data. In some cases, data may be organized differently in different related datasets. The data schema may change between datasets or additional variables may be included in some datasets relative to other datasets. In some cases, related datasets may contain synthetic datasets generated by models which share characteristics with other datasets containing actual data (e.g., anonymized datasets may share statistical features, variable or column names, or the like). As another illustration, related datasets may contain similar data collected at different time points, from different locations, from different populations, etc. For example, datasets may contain observations of rainfall, stock price, hospitalization records, transactions, or the like collected at different times.

Conventional systems and methods of searching datasets to identify related datasets may involve searching datasets for a search term (e.g., a string, a number, etc.) and may base results on the frequency of terms and/or clustering of terms. However, this approach may be unsatisfactory at least because it may be inefficient and because search term searches do not identify relationships based on the underlying data structure.

Other conventional methods of determining whether data are related may use metadata (e.g., data lineage methods). However, these approaches may be ineffective where metadata are unavailable and where metadata may be managed according to non-standardized rules. Further, metadata-based methods suffer from deficiencies because these methods may not be based on the features of the datasets (e.g., statistical characteristics or data schema). For example, metadata-based approaches may be unable compare two datasets and determine whether two datasets relate based on properties or characteristics of the datasets (e.g., based on statistical measures). Further, metadata-based methods and other approaches to identifying related datasets may suffer from a lack of flexibility at least because these approaches may be limited to particular kinds of data and/or data schema.

Therefore, in view of the shortcomings and problems with conventional approaches to searching datasets to identify related datasets, there is a need for flexible, unconventional approaches that efficiently and effectively search and classify datasets of any type (e.g., by identifying related datasets).

SUMMARY

The disclosed embodiments provide unconventional methods and systems for searching datasets and classifying datasets (e.g., determining whether datasets are related). As compared to conventional solutions, the embodiments include greater accuracy and efficiency because methods may involve training data models to generate synthetic data based on reference datasets and the methods may use features of the models to determine whether a test dataset relates to one or more reference datasets. By using features of synthetic-data models to determine a relationship between datasets, systems and methods disclosed herein provide greater flexibility, accuracy, and efficiency as compared to conventional approaches. For example, the disclosed systems and methods may use machine learning to determine whether datasets of any type relate, while conventional methods may be limited to particular kinds of datasets and/or data schemas (i.e., a data structure or organization). Further, by indexing features of the synthetic-data models that relate to reference datasets, systems and methods disclosed herein may rapidly search datasets and identify similar datasets.

Consistent with the present embodiments, a system for searching datasets is disclosed. The system may include one or more memory units storing instructions and one or more processors configured to execute the instructions to perform operations. The operations may include receiving a test dataset from a client device and generating a test data model output using a data model, based on the test dataset. The operations may include processing the test data model output. The processing may include implementing at least one of an encoding method, a factorizing method, or a vectorizing method. The operations may include retrieving a reference data model output from a dataset index. The reference data model output may be based on a reference dataset. The operations may include generating a similarity metric based on the reference data model output and the test data model output. The operations may include classifying the test dataset based on the similarity metric. the operations may include transmitting, to the client device, information comprising the classification of the test dataset.

Consistent with the present embodiments, a method for searching datasets is disclosed. The method may include receiving a test dataset from a client device and generating a test data model output using a data model, based on the test dataset. The method may include processing the test data model output. The processing may include implementing at least one of an encoding method, a factorizing method, or a vectorizing method. The method may include retrieving a reference data model output from a dataset index. The reference data model output may be based on a reference dataset. The method may include generating a similarity metric based on the reference data model output and the test data model output. The method may include classifying the test dataset based on the similarity metric. The method may include transmitting, to the client device, information comprising the classification of the test dataset.

Consistent with other disclosed embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as a machine constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Consistent with disclosed embodiments, systems and methods for searching datasets and classifying datasets (e.g., determining whether datasets are related) are disclosed.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (i.e., structure), including a data type, key-value pair, label, metadata, field, relationship, view, index, package, procedure, function, trigger, sequence, synonym, link, directory, queue, or the like. Datasets of the embodiments may contain foreign keys, i.e., data elements that appear in multiple datasets and may be used to cross-reference data and determine relationships between datasets. Foreign keys may be unique (e.g., a personal identifier) or shared (e.g., a postal code). Datasets of the embodiments may be "clustered," i.e., a group of datasets may share common features, such as overlapping data, shared statistical properties, etc. Clustered datasets may share hierarchical relationships (i.e., data lineage).

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
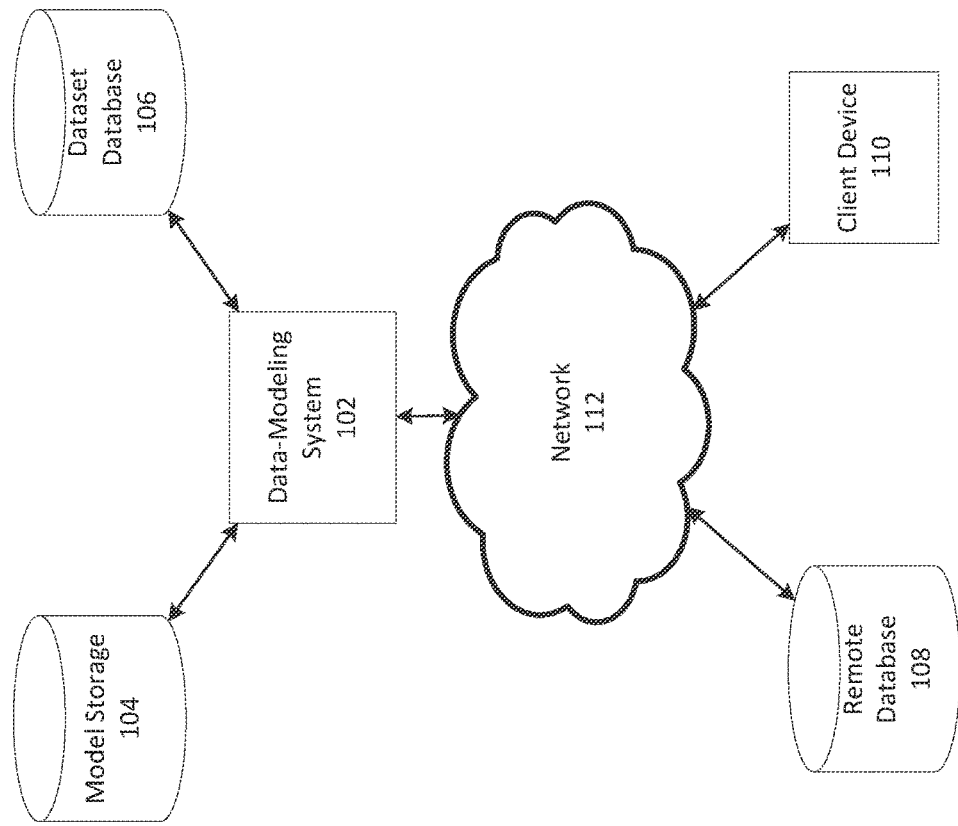
FIG. 1 depicts an exemplary system for searching datasets, consistent with disclosed embodiments.

FIG. 1 depicts exemplary system 100 for searching datasets, consistent with disclosed embodiments. As shown, system 100 may include a data-modeling system 102, a model storage 104, a dataset database 106, a remote database 108, and a client device 110. Components of system 100 may be connected to each other through a network 112.

In some embodiments, aspects of system 100 may be implemented on one or more cloud services designed to generate ("spin-up") one or more ephemeral container instances in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of data-modeling systems, model storages, dataset databases, remote databases, client devices and/or networks. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Data-modeling system 102 may include a computing device, a computer, a server, a server cluster, a plurality of clusters, and/or a cloud service, consistent with disclosed embodiments. Data-modeling system 102 may include one or more memory units and one or more processors configured to perform operations consistent with disclosed embodiments. Data-modeling system 102 may include computing systems configured to generate, receive, retrieve, store, and/or provide data models and/or datasets, consistent with disclosed embodiments. Data-modeling system 102 may include computing systems configured to generate and train models, consistent with disclosed embodiments. Data-modeling system 102 may be configured to receive data from, retrieve data from, and/or transmit data to other components of system 100 and/or computing components outside system 100 (e.g., via network 112). Data-modeling system 102 is disclosed in greater detail below (in reference to FIG. 3).

Model storage 104 may be hosted on one or more servers, one or more clusters of servers, or one or more cloud services. Model storage 104 may be connected to network 112 (connection not shown). In some embodiments, model storage 104 may be a component of data-modeling system 102 (not shown).

Model storage 104 can include one or more databases configured to store data models (e.g., machine-learning models or statistical models) and descriptive information of the data models. Model storage 104 may be configured to provide information regarding available data models to a user or another system. The databases may include cloud-based databases, cloud-based buckets, or on-premises databases. The information may include model information, such as the type and/or purpose of the model and any measures of classification error. Model storage 104 may include one or more databases configured to store indexed and clustered models for use by data-modeling system 100. For example, model storage 104 may store models associated with generalized representations of those models (e.g., neural network architectures stored in TENSORFLOW or other standardized formats). The databases can include cloud-based databases (e.g., AMAZON WEB SERVICES RELATIONAL DATABASE SERVICE) or on-premises databases.

Dataset database 106 may include one or more databases configured to store data for use by system 100, consistent with disclosed embodiments. In some embodiments, dataset database may be configured to store datasets and/or one or more dataset indexes, consistent with disclosed embodiments. Dataset database 106 may include a cloud-based database (e.g., AMAZON WEB SERVICES RELATIONAL DATABASE SERVICE) or an on-premises database. Dataset database 106 may include datasets, model data (e.g., model parameters, training criteria, performance metrics, etc.), and/or other data, consistent with disclosed embodiments. Dataset database 106 may include data received from one or more components of system 100 and/or computing components outside system 100 (e.g., via network 112). In some embodiments, dataset database 106 may be a component of data-modeling system 102 (not shown).

Remote database 108 may include one or more databases configured to store data for use by system 100, consistent with disclosed embodiments. Remote database 108 may be configured to store datasets and/or one or more dataset indexes, consistent with disclosed embodiments. Remote database 108 may include a cloud-based database (e.g., AMAZON WEB SERVICES RELATIONAL DATABASE SERVICE) or an on-premises database.

Client device 110 may include one or more memory units and one or more processors configured to perform operations consistent with disclosed embodiments. In some embodiments, client device 110 may include hardware, software, and/or firmware modules. Client device 110 may include a mobile device, a tablet, a personal computer, a terminal, a kiosk, a server, a server cluster, a cloud service, a storage device, a specialized device configured to perform methods according to disclosed embodiments, or the like.

At least one of data-modeling system 102, model storage 104, dataset database 106, remote database 108, or client device 110 may be connected to network 112. Network 112 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 112 may be connected to other networks (not depicted in FIG. 1) to connect the various system components to each other and/or to external systems or devices. In some embodiments, network 112 may be a secure network and require a password to access the network.

Figure 2:
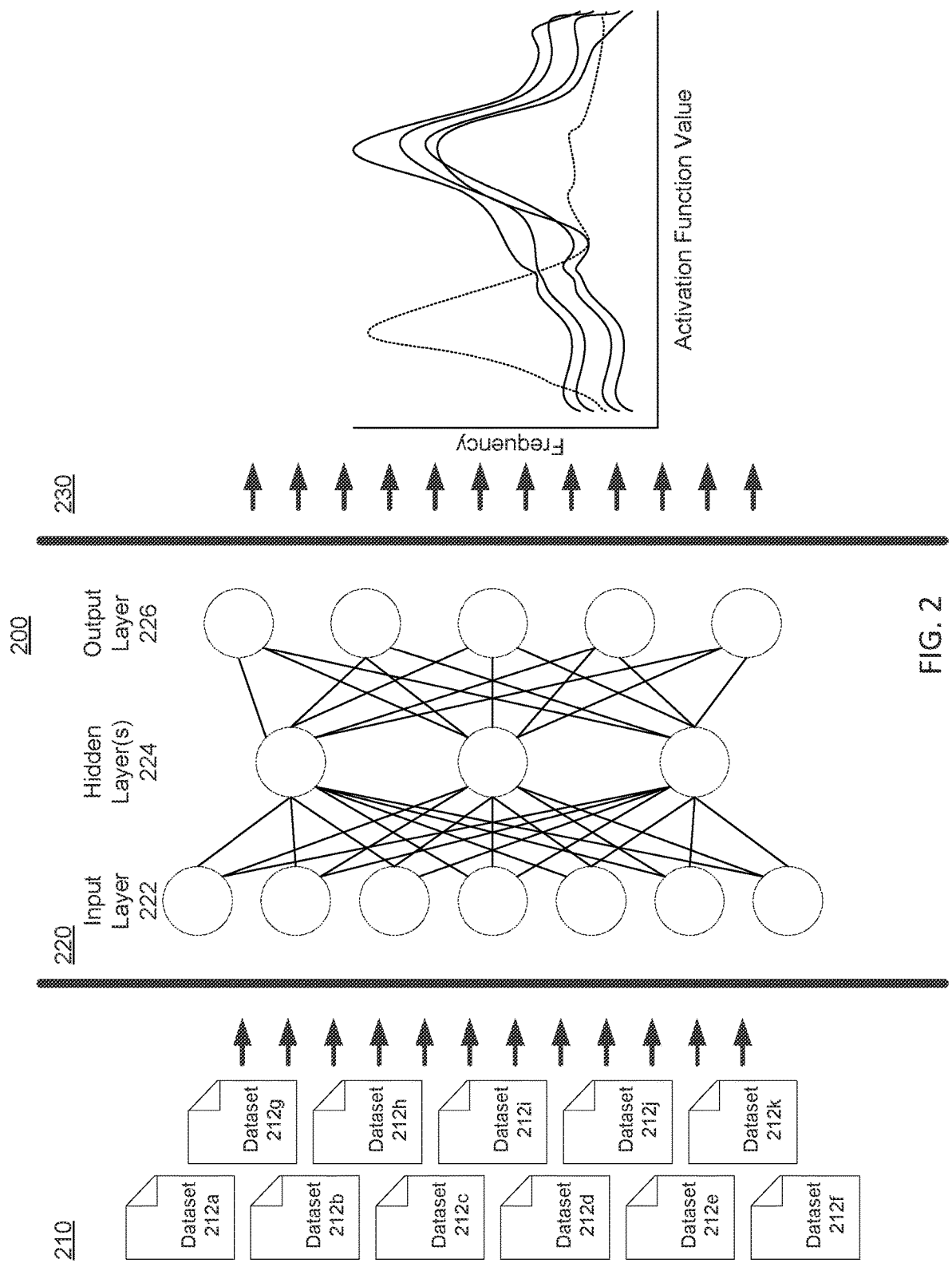
FIG. 2 illustrates a method for classifying a dataset using data models, consistent with disclosed embodiments.

FIG. 2 illustrates a method 200 for classifying a dataset using data models, consistent with disclosed embodiments. FIG. 2 is provided for purposes of illustration only and is not intended to be limiting on the embodiments. Embodiments consistent with the present disclosure may include methods for classifying datasets that differ from the method depicted in FIG. 2.

At step 210, data-modeling system may receive a plurality of input datasets 212$a$, 212$b$, 212$c$, 212$d$, 212$e$, 212$f$, 212$g$, 212$h$, 2121, 212$j$, and 212$k$, consistent with disclosed embodiments. Datasets may be received from a data storage. For example, the datasets may be received and/or retrieved from client device 110, dataset database 106, remote database 108, other components of system 100, and/or computing components outside system 100.

At step 220, data-modeling system may retrieve and implement a data-model one or more times to generate data-model output based on the input datasets, consistent with disclosed embodiments. For example, the data-model may be retrieved from model storage 104. The data-model may be a machine learning model trained to generate synthetic data, consistent with disclosed embodiments. In some embodiments, the data-model was trained to generate synthetic data based on one or more input datasets. Data-model output may include activation function values, node outputs, weights of a node and/or layer, a number of nodes activated in a given layer (i.e., node volume), presence of a learned embedding layer, synthetic data, and/or other data model output.

As shown at step 220, the data model may include a plurality of neural network nodes, represented by discs. Nodes may include activation functions, logic gates, and/or other components of neural network models. Nodes may be organized into an input layer 222, one or more hidden layers 224, and an output layer 226. represented by vertically stacked discs. Lines between nodes indicate that output of one node may be routed as input to another node. The data-model of process 200 may be a fully-connected data model, as shown, in which the nodes of one layer accepts output from all nodes of all previous layers, or the data-model may not be a fully connected model. As one of skill in the art will appreciate, other data models may be used at step 220 with more or fewer nodes and more or fewer layers.

At step 230, data-modeling system 102 displays data-model output, consistent with disclosed embodiments. For example, as shown, data-model output may display a graphical representation of distributions of activation function values. Activation function values may be generated in the neural network nodes of step 220. In the example of step 230, a series of lines depict the frequency (y-axis) plotted against activation function values (x-axis). Lines may correspond to the one or more input datasets received at step 210.

In the example, a set of solid lines correspond to datasets that produce activation function values with statistically similar distributions (e.g., with similar modes as illustrated by the overlapping peaks), while the dashed line corresponds to a dataset that produces a statistically different distribution of activation function values. Based on shape or statistical properties of the distribution, data-modeling system 102 may determine that the datasets corresponding to the solid lines relate to each other, while the dataset corresponding to the dashed line does not relate to the other datasets.

Figure 3:
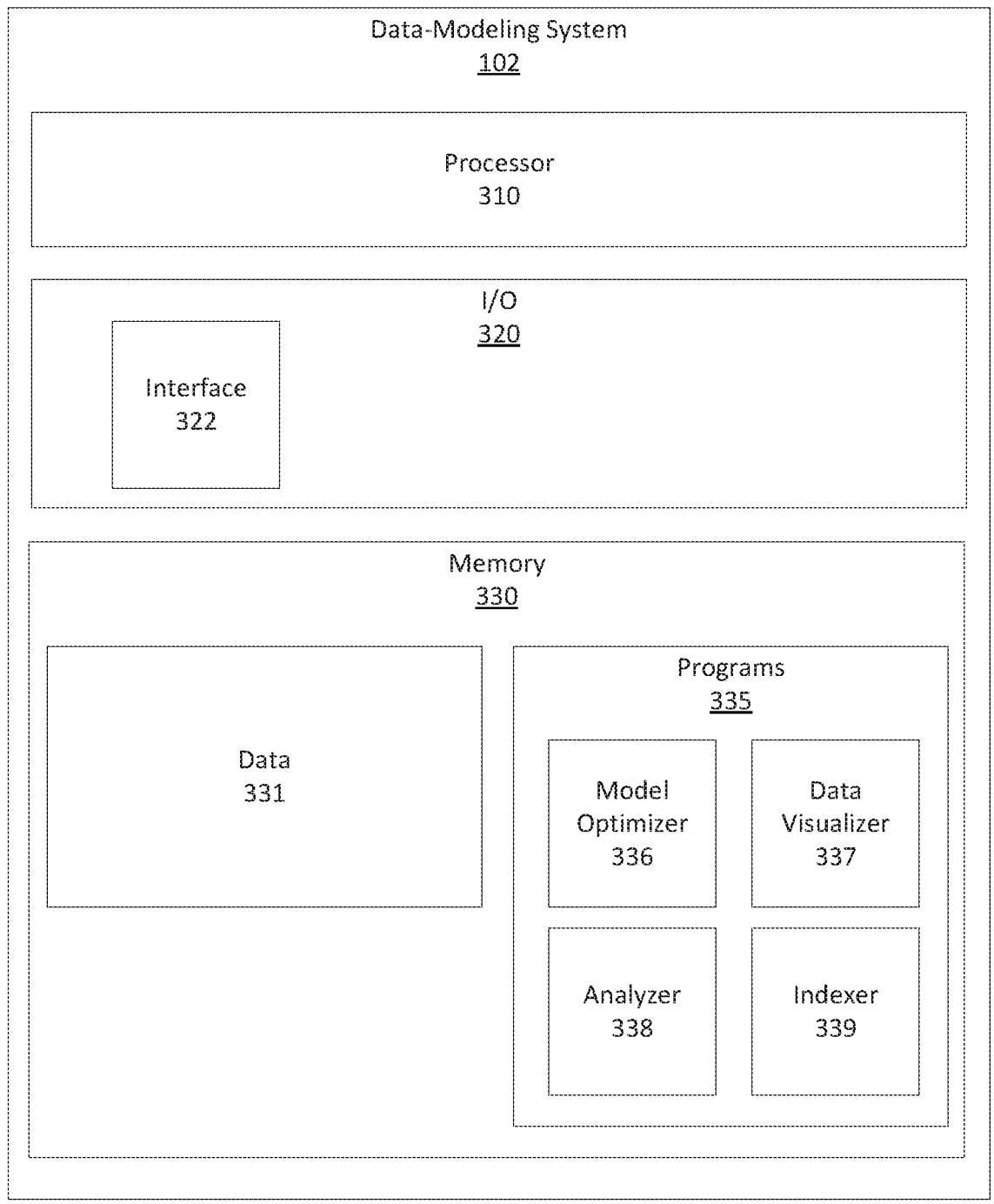
FIG. 3 depicts an exemplary data-modeling system, consistent with disclosed embodiments.

FIG. 3 depicts exemplary data-modeling system 102, consistent with disclosed embodiments. Data-modeling system 102 may comprise a computing device, a computer, a server, a server cluster, a plurality of clusters, and/or a cloud service, consistent with disclosed embodiments. As shown, data-modeling system 102 may include one or more processors 310, one or more I/O devices 320, and one or more memory units 330. In some embodiments, some or all components of data-modeling system 102 may be hosted on a device, a computer, a server, a cluster of servers, or a cloud service. In some embodiments, data-modeling system 102 may be a scalable system configured to efficiently manage resources and enhance security by provisioning computing resources in response to triggering events and terminating resources after completing a task (e.g., a scalable cloud service that spins up and terminates container instances).

FIG. 3 depicts an exemplary configuration of data-modeling system 102. As will be appreciated by one skilled in the art, the components and arrangement of components included in data-modeling system 102 may vary. For example, as compared to the depiction in FIG. 3, data-modeling system 102 may include a larger or smaller number of processors, I/O devices, or memory units. In addition, data-modeling system 102 may further include other components or devices not depicted that perform or assist in the performance of one or more processes consistent with the disclosed embodiments. The components and arrangements shown in FIG. 3 are not intended to limit the disclosed embodiments, as the components used to implement the disclosed processes and features may vary.

Processor 310 may comprise known computing processors, including a microprocessor. Processor 310 may constitute a single-core or multiple-core processor that executes parallel processes simultaneously. For example, processor 310 may be a single-core processor configured with virtual processing technologies. In some embodiments, processor 310 may use logical processors to simultaneously execute and control multiple processes. Processor 310 may implement virtual machine technologies, or other known technologies to provide the ability to execute, control, run, manipulate, store, etc., multiple software processes, applications, programs, etc. In another embodiment, processor 310 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 310 may execute various instructions stored in memory 330 to perform various functions of the disclosed embodiments described in greater detail below. Processor 310 may be configured to execute functions written in one or more known programming languages.

I/O devices 320 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 320 may be components of an interface (e.g., a user interface).

Interface 322 may be configured to manage interactions between system 100 and other systems using network 112. In some aspects, interface 322 may be configured to publish data received from other components of system 100. This data may be published in a publication and subscription framework (e.g., using APACHE KAFKA), through a network socket, in response to queries from other systems, or using other known methods. Data may be synthetic data, as described herein. As an additional example, interface 322 may be configured to provide information received from other components of system 100 regarding datasets. In various aspects, interface 322 may be configured to provide data or instructions received from other systems to components of system 100. For example, interface 322 may be configured to receive instructions for generating data models (e.g., type of data model, data model parameters, training data indicators, training parameters, or the like) from another system and provide this information to programs 335. As an additional example, interface 322 may be configured to receive data including sensitive data from another system (e.g., in a file, a message in a publication and subscription framework, a network socket, or the like) and provide that data to programs 335 or store that data in, for example, data 331, dataset database 106, and/or remote database 108.

In some embodiments, interface 322 may include a user interface configured to receive user inputs and provide data to a user (e.g., a data manager). For example, interface 322 may include a display, a microphone, a speaker, a keyboard, a mouse, a track pad, a button, a dial, a knob, a printer, a light, an LED, a haptic feedback device, a touchscreen and/or other input or output devices.

Memory 330 may be a volatile or non-volatile, magnetic, semiconductor, optical, removable, non-removable, or other type of storage device or tangible (i.e., non-transitory) computer-readable medium, consistent with disclosed embodiments. As shown, memory 330 may include data 331, including one of at least one of encrypted data or unencrypted data. Consistent with disclosed embodiments, data 331 may include datasets, model data (e.g., model parameters, training criteria, performance metrics, etc.), and/or other data.

Programs 335 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 335 may be written in one or more programming or scripting languages. One or more of such software sections or modules of memory 330 may be integrated into a computer system, non-transitory computer-readable media, or existing communications software. Programs 335 may also be implemented or replicated as firmware or circuit logic.

Programs 335 may include a model optimizer 336, a data visualizer 337, an analyzer 338, an indexer 339, and/or other components (e.g., modules) not depicted to perform methods of the disclosed embodiments. In some embodiments, modules of programs 335 may be configured to generate ("spin up") one or more ephemeral container instances (e.g., an AMAZON LAMBDA instance) to perform a task and/or to assign a task to a running (warm) container instance, consistent with disclosed embodiments. Modules of programs 335 may be configured to receive, retrieve, and/or generate models, consistent with disclosed embodiments. Modules of programs 335 may be configured to perform operations in coordination with one another.

Model optimizer 336 may include programs (scripts, functions, algorithms) to train, implement, store, receive, retrieve, and/or transmit one or more machine-learning models. Machine-learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model and/or another machine-learning model. Models may include an ensemble model (i.e., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. Model optimizer 336 may be configured to adjust model parameters during training. Model parameters may include weights, coefficients, offsets, or the like. Training may be supervised or unsupervised.

Model optimizer 336 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Model optimizer 336 may be configured to optimize statistical models using known optimization techniques.

In some embodiments, model optimizer 336 may be configured to generate models based on instructions received from another component of system 100 and/or a computing component outside system 100 (e.g., via interface 322, from client device 110, etc.). For example, model optimizer 336 may be configured to receive a visual (graphical) depiction of a machine learning model and parse that graphical depiction into instructions for creating and training a corresponding neural network. Model optimizer 336 may be configured to select model training parameters. This selection may be based on model performance feedback received from another component of system 100. Model optimizer 336 may be configured to provide trained models and descriptive information concerning the trained models to model storage 104.

Model optimizer 336 may be configured to train data models to generate synthetic data based on an input dataset (e.g., a dataset comprising actual data). For example, model optimizer 336 may be configured to train data models to generate synthetic data by identifying and replacing sensitive information in a dataset. In some embodiments, model optimizer 336 may be configured to train data models to generate synthetic data based on a data profile (e.g., a data schema and/or a statistical profile of a dataset). For example, model optimizer 336 may be configured to train data models to generate synthetic data to satisfy a performance criterion. Performance criteria may be based on a similarity metric representing a measure of similarity between the synthetic data and the input data dataset.

Model optimizer 336 may be configured to determine model brittleness (i.e., to determine a stable, generalizable model). A model may be considered a brittle model if it may fail to converge during training. For example, model optimizer 336 may be configured to determine a brittleness score based on a percentage of training runs that reach a converge outcome describing whether a model reaches a state that satisfies one or more training criterions. In some embodiments, a brittleness score may be based on a variance of architectural hyperparameters. A high variance in an architectural hyperparameter associated with high accuracy after model training may indicate a favorable and/or acceptable brittleness score. In some cases, a high variance in which only a few architectural hyperparameters achieve high accuracy after model training may indicate a poor and/or unacceptable brittleness score.

Data visualizer 337 may include programs (scripts, functions, algorithms) to configure data for visualizations and provide visualizations of datasets and data models. In some embodiments, data visualizer may include programs to generate graphs and display those graphs (e.g., via interface 322). In some embodiments, data visualizer 337 may include programs to generate histograms, scatter plots, time series, or the like. In some embodiments, data visualizer 337 may be configured to display properties of data models and data model training results including, for example, architecture, loss functions, cross entropy, activation function values, embedding layer structure and/or outputs, convolution results, node outputs, or the like. For example, data visualizer may include code configured for display using a standard platform (e.g., TENSORBOARD).

Analyzer 338 may include programs configured to retrieve, store, and/or analyze properties of data models and datasets. For example, analyzer 338 may include or be configured to implement one or more data-profiling models. A data-profiling model may include machine-learning models and statistical models to determine the data schema and/or a statistical profile of a dataset (i.e., to profile a dataset), consistent with disclosed embodiments. A data-profiling model may include an RNN model, a CNN model, or other machine-learning model.

In some embodiments, analyzer 338 may include algorithms to determine a data type, key-value pairs, row-column data structure, statistical distributions of information such as keys or values, or other property of a data schema may be configured to return a statistical profile of a dataset (e.g., using a data-profiling model). In some embodiments, analyzer 338 may be configured to implement univariate and multivariate statistical methods. Analyzer 338 may include a regression model, a Bayesian model, a statistical model, a linear discriminant analysis model, or other classification model configured to determine one or more descriptive metrics of a dataset. For example, analyzer 338 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

In some embodiments, analyzer 338 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, analyzer 338 may be configured to generate a similarity metric representing a measure of similarity between data in a dataset. A similarity metric may be based on a correlation, covariance matrix, a variance, a frequency of overlapping values, or other measure of statistical similarity.

In some embodiments, analyzer 338 may be configured to generate a similarity metric based on data-model output, including data-model output representing a property of the data-model. For example, analyzer 338 may be configured to generate a similarity metric based on activation function values, embedding layer structure and/or outputs, convolution results, entropy, loss functions, model training data, or other data-model output). For example, a synthetic data-model may produce first data-model output based on a first dataset and a produce data-model output based on a second dataset, and a similarity metric may be based on a measure of similarity between the first data-model output and the second-data model output. In some embodiments, the similarity metric may be based on a correlation, a covariance, a mean, a regression result, or other similarity between a first data-model output and a second data-model output. Data-model output may include any data-model output as described herein or any other data-model output (e.g., activation function values, entropy, loss functions, model training data, or other data-model output). In some embodiments, the similarity metric may be based on data-model output from a subset of model layers. For example, the similarity metric may be based on data-model output from a model layer after model input layers or after model embedding layers. As another example, the similarity metric may be based on data-model output from the last layer or layers of a model.

In some embodiments, analyzer 338 may be configured to classify a dataset. Classifying a dataset may include determining whether a data-set is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as a node diagram, a tree diagram, or a vector diagram of datasets. Classifying a dataset may include estimating a likelihood that a dataset relates to another dataset, the likelihood being based on the similarity metric.

Analyzer 338 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, analyzer 338 is configured to generate and/or train a classification model to classify a dataset, consistent with disclosed embodiments.

Analyzer 338 may be configured to classify a dataset based on data-model output, consistent with disclosed embodiments. For example, analyzer 338 may be configured to classify a dataset based on a statistical profile of a distribution of activation function values. In some embodiments, analyzer 338 may be configured to classify a dataset at least one of an edge, a foreign key, a data schema, or a similarity metric, consistent with disclosed embodiments. In some embodiments, the similarity metric represents a statistical similarity between data-model output of a first dataset and a second dataset, consistent with disclosed embodiments. As another example, data classification module may classify a dataset as a related dataset based on determination that a similarity metric between the dataset and a previously classified dataset satisfies a criterion.

Analyzer 338 may be configured to perform an encoding method, consistent with disclosed embodiments. An encoding method may include using an autoencoder model to reduce the dimensionality of data. An autoencoder model may include an encoder model and a decoder model, the encoder model and decoder model being machine learning models trained simultaneously. An encoding method may include performing principle component analysis to reduce the dimensionality of data.

Analyzer 338 may be configured to perform a factorizing method, consistent with disclosed embodiments. In some embodiments, a factorizing method may include performing a non-negative matrix factorization method (NMF), transforming a matrix into component vectors. A factorizing method may include choosing a component vector to store in a dataset index. In some embodiments, a factorizing method may include performing simplex volume maximization (SiVM). In some embodiments, a factorizing method may include an independent component analysis (ICA) and/or a principle component analysis (PCA).

Analyzer 338 may be configured to perform a vectorizing method, consistent with disclosed embodiments. In some embodiments, a vectorizing method may include transforming two-dimensional data (e.g., rows and columns) into one-dimensional data. For example, vectorizing may include transforming row and column data into a vector by appending rows. Indexer 339 may include programs (scripts, functions, algorithms, routines, or the like) to generate and maintain searchable data indexes based on datasets (e.g., a B-Tree). Indexer 339 may include a dataset index comprised of information based on datasets (e.g., data model output based on the datasets), consistent with disclosed embodiments. In some embodiments, indexer 339 may include programs based on POSTGRESQL or other object-relational database management system. For example, indexer 339 may be configured to generate a data index (e.g., a RUM-index and/or GIN-index and/or Locality-Sensitive Hashing). The data index may be configured to be searched (e.g., as a data tree). The data index may be based on the data-model output and/or data profiles and organized for efficient searching with or without using k-nearest neighbors clustering-based methods. In some embodiments, indexer 339 may be configured to conduct a search of an index, consistent with disclosed embodiments.

Indexer 339 may be configured to execute a search of the data index. In some embodiments, indexer 339 may be configured to receive search parameters such as the types of data to search or other information related to data types and schemas to guide the search of the data index. For example, the search parameters may indicate that the search will weigh the data schema of a dataset more than the particular data values or statistical metrics of the dataset. Search parameters may be received from another component of system 100 and/or a computing component outside system 100 (e.g., via interface 322). In some embodiments, the search parameters may include instructions to search a data index by first comparing data schemas then by comparing statistical metrics. The search parameters may include instructions to search a dataset by comparing data profiles (i.e., schema and statistical metrics) of datasets and/or by comparing data profiles of variables (e.g., data columns) of a dataset. In some embodiments, indexer 339 may be configured to generate search parameters using a machine learning model trained to use learned features of data to improve search accuracy.

Figure 4:
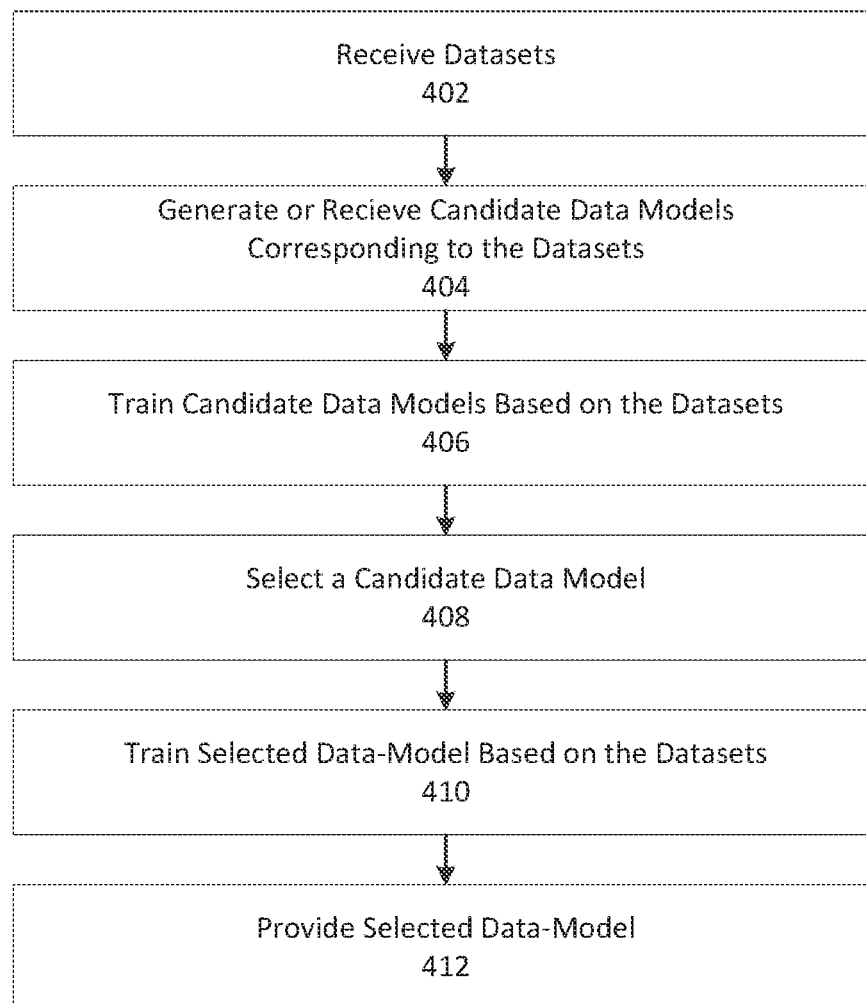
FIG. 4 depicts an exemplary process for selecting a candidate data model, consistent with disclosed embodiments.

FIG. 4 depicts exemplary process 400 for selecting a candidate data model, consistent with disclosed embodiments. In some embodiments, data-modeling system 102 may perform process 400 using programs 335. One or more of model optimizer 336, data visualizer 337, analyzer 338, indexer 339, or other components of programs 335 may perform operations of process 400, consistent with disclosed embodiments. It should be noted that other components of system 100, including, for example, client device 110 may perform operations of one or more steps of process 400.

Consistent with disclosed embodiments, steps of process 400 may be performed on one or more cloud services using one or more ephemeral container instances (e.g., AMAZON LAMBDA). For example, at any of the steps of process 400, data-modeling system 102 may generate (spin up) an ephemeral container instance to execute a task, assign a task to an already-running ephemeral container instance (warm container instance), or terminate a container instance upon completion of a task. As one of skill in the art will appreciate, steps of process 400 may be performed as part of an application interface (API) call.

At step 402, data-modeling system 102 may receive one or more datasets, consistent with disclosed embodiments. In some embodiments, step 402 may include receiving a dataset from data 231, one or more client devices (e.g., client device 110), dataset database 106, remote database 108, and/or a computing component outside system 100. Step 402 may include retrieving a dataset from a data storage (e.g., from data 331, dataset database 106, and/or remote database 108). Datasets of step 402 may include any of the types of datasets previously described or any other type of dataset. Datasets of step 402 may have a range of formats, data schema, and/or statistical profiles.

At step 404, data-modeling system 102 may generate or receive one or more candidate data models corresponding to the datasets, consistent with disclosed embodiments. A candidate data model may be a machine learning model, including a synthetic data model, consistent with disclosed embodiments. In some embodiments, a candidate data model may include a GAN model, an RNN model, a deep learning model (e.g., an LSTM model), a random forest model, a CNN model, an SVM model, and/or another machine learning model. Generating a data model may include initializing the model with predetermined model parameters (i.e., seeding the model). Step 404 may include receiving or retrieving a data model from a data storage (e.g., from data 331 and/or model storage 104).

In some embodiments, generating or retrieving a candidate data model may be based on a previously trained model, a similarity metric of a dataset to another dataset, a data schema, and/or a statistical metric of a dataset. For example, data-modeling system 102 may generate or retrieve a model based on an indication that a previously-trained data model met a performance criterion when generating synthetic data based on a dataset with a particular data schema, similarity metric, and/or statistic metric. Data-modeling system 102 may select a model type, model parameter, and/or model hyperparameter of a generated or retrieved candidate model based on a previously-trained model.

At step 406, data-modeling system 102 may train one or more candidate data models to generate synthetic data based on the corresponding datasets, consistent with disclosed embodiments. Training at step 406 may include setting respective architectural features of the one or more candidate models.

In some embodiments, training of a candidate model may terminate at step 406 when a training criterion is satisfied. Training criteria may include a number of epochs, a training time, a performance metric (e.g., a similarity metric), or the like. Step 406 may include adjusting model parameters during training and/or hyperparameter tuning. Model parameters may include weights, coefficients, offsets, or the like. Training at step 406 may be supervised or unsupervised.

At step 408, data-modeling system 102 may select one or more candidate data models, consistent with disclosed embodiments. Selecting a candidate data model may be based on an architectural feature (e.g., an architectural hyperparameter). For example, data-modeling system 102 may select the candidate data model with the largest number of hidden layers. In some embodiments, data-modeling system 102 selects a data model based on an indication that the model architecture indicating a low level of brittleness.

At step 410, data-modeling system 102 may train a selected data-model based on the datasets, consistent with disclosed embodiments. Step 410 may include training a selected data-model to generate synthetic data based on one or more datasets. In some embodiments, data-modeling system trains a selected data-model to generate synthetic data based on each of the datasets. Training at step 410 may terminate when a training criterion is satisfied, consistent with disclosed embodiments.

At step 412, data-modeling system 102 may provide a selected data-model, consistent with disclosed embodiments. Providing a selected data-model may include storing the selected data-model (e.g., in data 331 and/or model storage 104). Providing a selected data-model may include transmitting the selected data-model to another component of system 100 (e.g., client device 110) and/or a component outside system 100.

Figure 5:
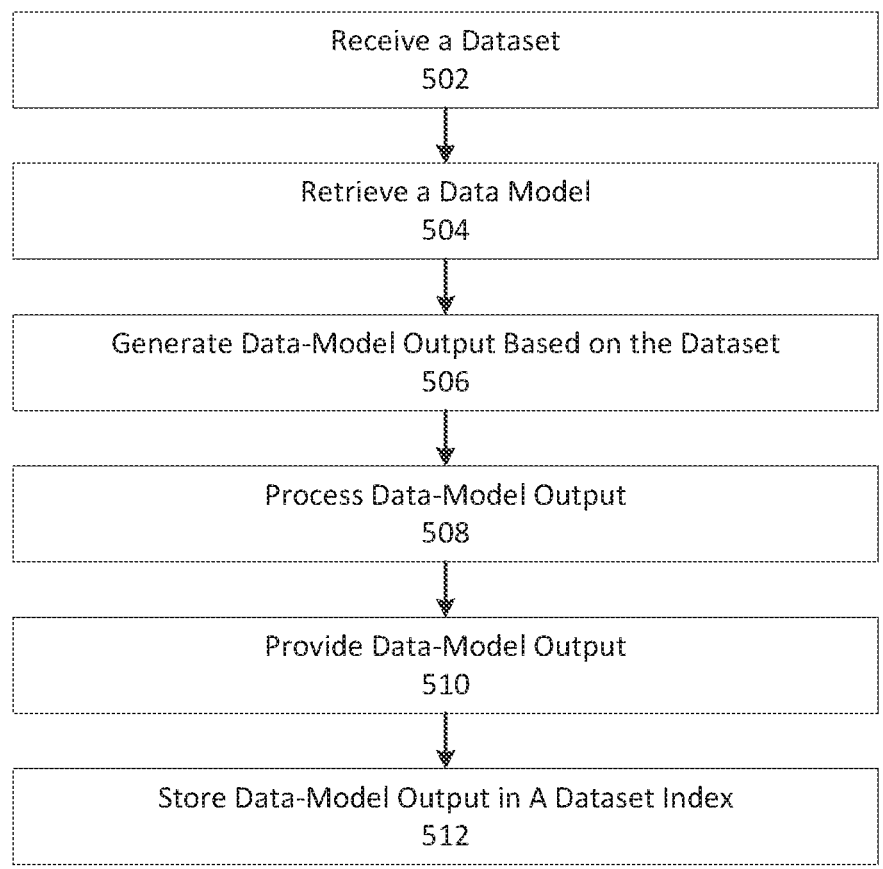
FIG. 5 depicts an exemplary process for creating a dataset index, consistent with disclosed embodiments.

FIG. 5 depicts exemplary process 500 for creating a dataset index, consistent with disclosed embodiments. In some embodiments, data-modeling system 102 may perform process 500 using programs 335. One or more of model optimizer 336, data visualizer 337, analyzer 338, indexer 339, or other components of programs 335 may perform operations of process 500, consistent with disclosed embodiments. It should be noted that other components of system 100, including, for example, client device 110 may perform operations of one or more steps of process 500.

Consistent with disclosed embodiments, steps of process 500 may be performed on one or more cloud services using one or more ephemeral container instances (e.g., AMAZON LAMBDA). For example, at any of the steps of process 500, data-modeling system 102 may generate (spin up) an ephemeral container instance to execute a task, assign a task to an already-running ephemeral container instance (warm container instance), or terminate a container instance upon completion of a task. As one of skill in the art will appreciate, steps of process 500 may be performed as part of an application interface (API) call.

At step 502, data-modeling system 102 may receive a dataset, consistent with disclosed embodiments. Data-modeling system 102 may receive a dataset from another component of system 100 (e.g., dataset database 106, remote database 108, or client device 110) and/or a computing component outside system 100 (e.g., via interface 322). In some embodiments, step 502 may include retrieving a dataset from a data storage (e.g., data 331, dataset database 106, and/or remote database 108).

At step 504, data-modeling system 102 may retrieve a data model, consistent with disclosed embodiments. Retrieving a data model may be based on the dataset (e.g., based on a data schema of a dataset). In some embodiments, step 504 may include retrieving a model trained via process 400 (e.g., a selected data-model).

At step 506, data-modeling system 102 may implement the retrieved data-model to generate data-model output based on the dataset. In some embodiments, the data-model output may include activation function values, embedding layer structure and/or outputs, convolution results, node outputs, synthetic data, and/or other data model output.

At step 508, data-modeling system 102 may process the data-model output. In some embodiments, processing the data-model output may include performing methods of process 700, described in further detail below, including an encoding method, a factorizing method, and/or a vectorizing method. In some embodiments, step 508 may include methods of normalizing or filtering data.

At step 510, data-modeling system 102 may provide data-model output, consistent with disclosed embodiments. Providing the data-model output may include storing the data-model output (e.g., in data 331 and/or model storage 104). Providing the data-model output may include transmitting the data-model output to another component of system 100 (e.g., client device 110) and/or a component outside system 100. Providing the data-model output may include generating a visualization of the data-model output (e.g., using data visualizer 337). Providing the data-model output may include displaying a visualization of the data-model output.

At step 512, data-modeling system 102 may store data-model output in a dataset index, consistent with disclosed embodiments. The dataset index may be a searchable data index, consistent with disclosed embodiments. In some embodiments, step 512 may include storing the dataset index in a data storage (e.g., data 331, dataset database 106, model storage 104). In some embodiments, step 512 may include retrieving a dataset index from and/or transmitting a dataset index to another component of system 100 and/or a computing component outside system 100.

Figure 6:
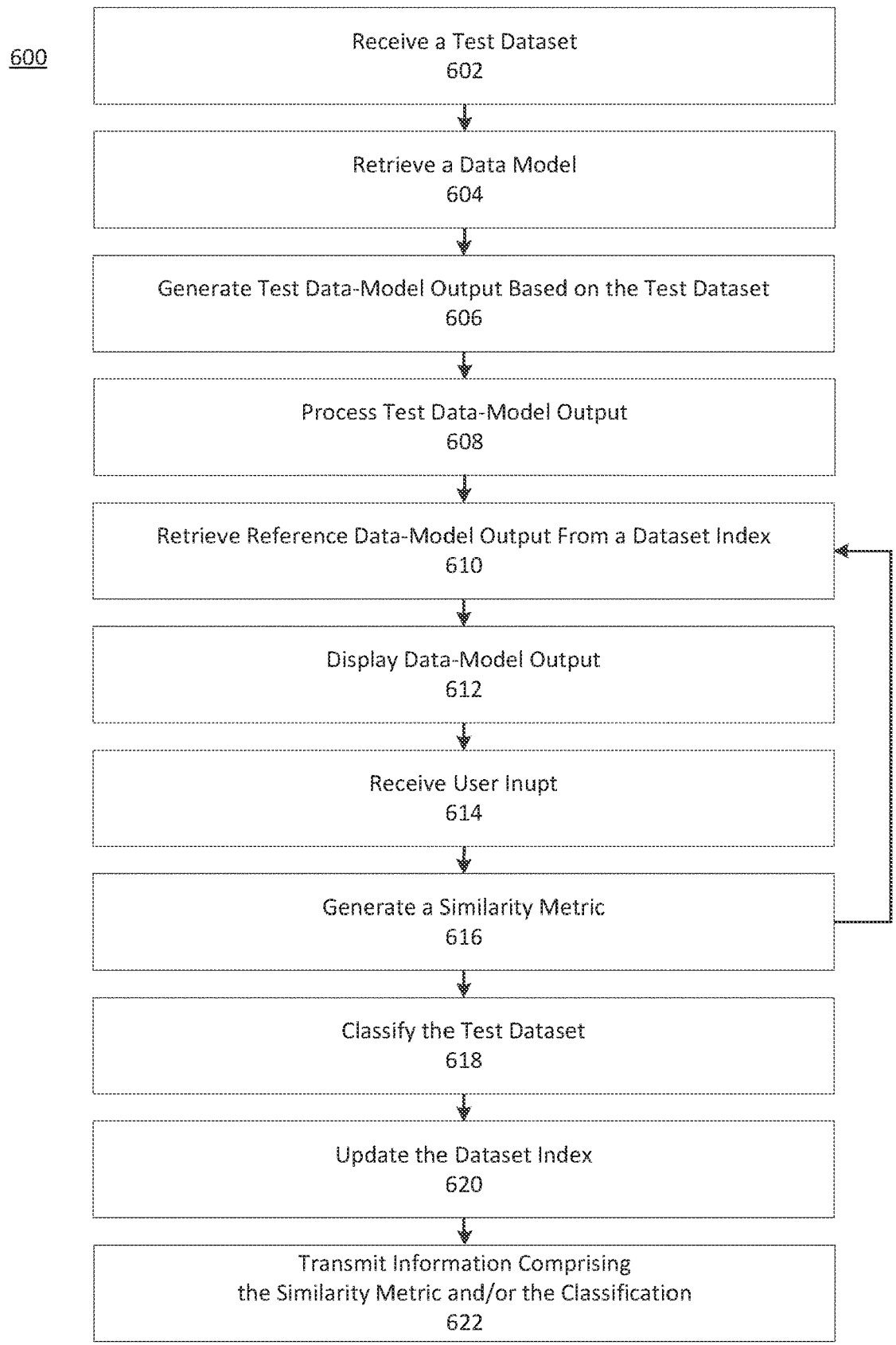
FIG. 6 depicts an exemplary process for searching a dataset index, consistent with disclosed embodiments.

FIG. 6 depicts exemplary process 600 for searching a dataset index, consistent with disclosed embodiments. In some embodiments, data-modeling system 102 may perform process 600 using programs 335. One or more of model optimizer 336, data visualizer 337, analyzer 338, indexer 339, or other components of programs 335 may perform operations of process 600, consistent with disclosed embodiments. It should be noted that other components of system 100, including, for example, client device 110 may perform operations of one or more steps of process 600.

Consistent with disclosed embodiments, steps of process 600 may be performed on one or more cloud services using one or more ephemeral container instances (e.g., AMAZON LAMBDA). For example, at any of the steps of process 600, data-modeling system 102 may generate (spin up) an ephemeral container instance to execute a task, assign a task to an already-running ephemeral container instance (warm container instance), or terminate a container instance upon completion of a task. As one of skill in the art will appreciate, steps of process 600 may be performed as part of an application interface (API) call.

At step 602, data-modeling system 102 may receive a test dataset, consistent with disclosed embodiments. Data-modeling system 102 may receive a test dataset from another component of system 100 (e.g., dataset database 106, remote database 108, or client device 110) or a computing component outside system 100 (e.g., via interface 322). In some embodiments, step 602 may include retrieving a test dataset from a data storage (e.g., data 331, dataset database 106, or remote database 108). The test dataset may include any type of data disclosed herein (numeric data, text data, and/or image data).

At step 604, data-modeling system 102 may retrieve a data model, consistent with disclosed embodiments. Retrieving a data model may be based on the dataset (e.g., based on a data schema). In some embodiments, step 604 may include retrieving a model trained via process 400 (e.g., a selected data-model). A data-model may include includes a GAN model, an RNN model, a deep learning model (e.g., an LSTM model), a random forest model, a CNN model, an SVM model, and/or another machine learning model.

At step 606, data-modeling system 102 may implement the retrieved data-model to generate test data-model output based on the test dataset, consistent with disclosed embodiments. In some embodiments, the data-model output may include activation function values, embedding layer structure and/or outputs, convolution results, node outputs, synthetic data, and/or other data model output.

At step 608, data-modeling system 102 may process the test data-model output, consistent with disclosed embodiments. In some embodiments, processing data-model output may include performing methods of process 700, described in further detail below, including an encoding method, a factorizing method, and/or a vectorizing method. In some embodiments, step 608 may include methods of normalizing or filtering data.

At step 610, data-modeling system 102 may retrieve a reference data-model output from a dataset index, consistent with disclosed embodiments. The dataset index may include metadata associated with a reference data-model. The dataset index may be a searchable data index, consistent with disclosed embodiments. For example, the dataset index may be stored as a tree.

At step 612, data-modeling system 102 may display test data model output and/or reference data-model output, consistent with disclosed embodiments. For example, displaying data-model output may include displaying a graph, a table, or other visualization of data-model output. In some embodiments, displaying data-model output may include a representation of activation function values, node outputs, synthetic data, and/or other data-model output.

At step 614, data-modeling system 102 may receive user input, consistent with disclosed embodiments. In some embodiments, the user input may be received via interface 322. In some embodiments, the user input may include commands to classify a reference data-model or the test-data model. For example, the user input may include commands to label a test-data model as being related to a reference data-model. As another example, the user input may include commands to label a test-data model as being not being related to a reference data-model.

At step 616, data-modeling system 102 may generate a similarity metric based on the test data-model output and the reference data-model output, consistent with disclosed embodiments. For example, the similarity metric may be based on activation function values, entropy, loss functions, model training data, or other data-model output.

As shown, steps 610 through 616 may be repeated any number of times. For example, based on the similarity generated at step 616, data-modeling system 102 may retrieve additional reference data-model output at step 610.

At step 618, data-modeling system 102 may classify a test dataset, consistent with disclosed embodiments. In some embodiments, the classification may be based on the user input of step 614 and/or the similarity metric of step 616. In some embodiments, the classification may include an indication of whether the test data-set is related to one or more reference datasets of the dataset index. A classification may include information indicating that the test dataset belongs to one or more dataset clusters. A classification may include information indicating a likelihood that the test dataset relates to a reference dataset, the likelihood being based on the similarity metric. In some embodiments, classifying a test dataset includes implementing a data classification model, consistent with disclosed embodiments.

In some embodiments, classifying a test dataset at step 618 may include clustering the test dataset and reference datasets, consistent with disclosed embodiments. In some embodiments, classifying a test dataset may include generating data describing the test dataset (e.g., a dataset index), including metadata, an indicator of whether data element is actual data or synthetic data, a data schema, a statistical profile, a relationship between the test dataset and one or more reference datasets (e.g., node and edge data), or other descriptive information. Edge data may be based on a similarity metric of step 616. Edge data may and indicate a similarity between datasets a hierarchical relationship (e.g., a data lineage, a parent-child relationship). In some embodiments, classifying a dataset may include generating graphical data, such as a node diagram, a tree diagram, or a vector diagram of datasets.

In some embodiments, at step 618, data-modeling system may retrieve a classification of one or more reference datasets and classifiy the test dataset based on the retrieved classification. For example, data-modeling system may retrieve a classification from data 331, dataset database 106, and/or a dataset index. In some embodiments, the retrieved classification may include node-edge data, cluster data, hierarchical relationship data, and/or other classification data.

At step 620, data-modeling system 102 may update the dataset index, consistent with disclosed embodiments. In some embodiments, updating the dataset index may include storing test-data model output in the dataset index. In some embodiments, updating the dataset index may include storing the dataset index in a data storage (e.g., data 331, dataset database 106, model storage 104. In some embodiments, step 620 may include transmitting the dataset index to another component of system 100 and/or a computing component outside system 100.

At step 622, data-modeling system 102 may transmit information comprising the similarity metric and/or the classification, consistent with disclosed embodiments. In some embodiments, step 622 may include transmitting information to another component of system 100 and/or a computing component outside system 100.

Figure 7:
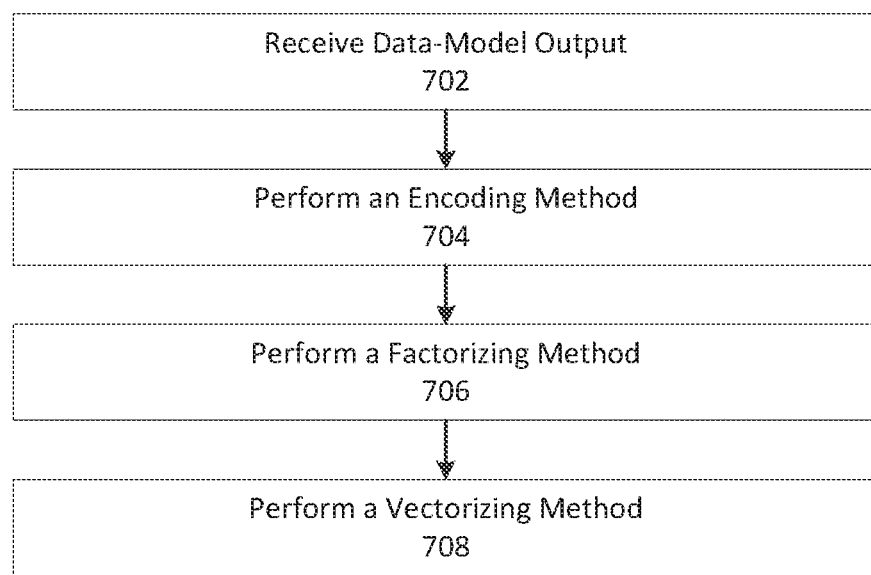
FIG. 7 depicts an exemplary process for processing data-model output, consistent with disclosed embodiments.

FIG. 7 depicts exemplary process 700 for processing data-model output, consistent with disclosed embodiments. In some embodiments, data-modeling system 102 may perform process 700 using programs 335. One or more of model optimizer 336, data visualizer 337, analyzer 338, indexer 339, or other components of programs 335 may perform operations of process 700, consistent with disclosed embodiments. It should be noted that other components of system 100, including, for example, client device 110 may perform operations of one or more steps of process 700.

Consistent with disclosed embodiments, steps of process 700 may be performed on one or more cloud services using one or more ephemeral container instances (e.g., AMAZON LAMBDA). For example, at any of the steps of process 700, data-modeling system 102 may generate (spin up) an ephemeral container instance to execute a task, assign a task to an already-running ephemeral container instance (warm container instance), or terminate a container instance upon completion of a task. As one of skill in the art will appreciate, steps of process 700 may be performed as part of an application interface (API) call.

At step 702, data-modeling system 102 may receive data-model output, consistent with disclosed embodiments. The data-model output may include any data-model output as described herein or any other data-model output.

At step 704, data-modeling system 102 may perform an encoding method, consistent with disclosed embodiments. An encoding method may include using an autoencoder model to reduce the dimensionality of data-model output. For example, an autoencoder model may include a variational autoencoder (VAE) model. An autoencoder model implemented at step 704 may include an encoder and a decoder model, the encoder and decoder being machine learning models trained simultaneously. In some embodiments, step 704 may include implementing the encoder model of the autoencoder model without implementing the decoder model. In this way, step 704 may reduce the dimensionality of data-model output. In some embodiments step 704 may include training an autoencoder based on data-model output associated with a plurality of datasets. In some embodiments, an encoding method includes performing principle component analysis to reduce the dimensionality of data-model output. An encoding method of step 704 may include encoding received data-model output of step 702. In some embodiments, an encoding method of step 704 may include encoding output of the factorizing method of step 706. In some embodiments, an encoding method of step 704 may include encoding output of the vectorizing method of step 708.

At step 706, data-modeling system 102 may perform a factorizing method, consistent with disclosed embodiments. In some embodiments, the factorizing method may include performing a non-negative matrix factorization method (NMF) to transform a matrix into component vectors. In some embodiments, factorizing at step 706 may include choosing a component vector to store in a dataset index. In some embodiments, a factorizing method may include performing simplex volume maximization (SiVM). In some embodiments, a factorizing method may include an independent component analysis (ICA) and/or a principle component analysis (PCA). A factorizing method of step 706 may include factorizing received data-model output of step 702. In some embodiments, a factorizing method of method of step 706 may include factorizing output of the encoding method of step 704.

At step 708, data-modeling system 102 may perform a vectorizing method, consistent with disclosed embodiments. In some embodiments the vectorizing method may include transforming two-dimensional data (e.g., rows and columns) into one-dimensional data. For example, vectorizing may include transforming row and column data into a vector by appending rows. A vectorizing method of step 708 may include vectorizing received data-model output of step 702. In some embodiments, a vectorizing method of step 708 may include vectorizing output of the encoding method of step 704. In some embodiments, a vectorizing method of step 708 may include vectorizing output of the factorizing method of step 706.

Systems and methods disclosed herein involve unconventional improvements over dataset searching approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for searching datasets, comprising:
one or more memory units storing instructions; and
one or more processors that execute the instructions to perform operations comprising:
    receiving a test dataset from a client device;
    generating, using a data model, test activation function values based on a test dataset, the test activation function values corresponding to nodes of the data model and determining whether the corresponding nodes fire;
    processing the test activation function values, the processing comprising implementing at least one of an encoding method, a factorizing method, or a vectorizing method on the test activation function values;
    retrieving reference activation function values from a dataset index, the reference activation function values being based on a reference dataset;
    generating a similarity metric based on the reference activation function values and the processed test activation function values;
    classifying the test dataset based on the similarity metric; and
    transmitting, to the client device, information comprising the classification of the test dataset.

2. The system of claim 1, wherein:
the data model is a selected data-model, and
the operations further comprise:
    receiving a plurality of input datasets;
    generating a plurality of candidate data models corresponding to the input datasets;
    training the candidate data models to generate synthetic data based on the corresponding input datasets, the training comprising setting respective architectural features of the candidate model;
    selecting a candidate data model based on the respective architectural features; and
    training the selected data-model to generate synthetic data based on the input datasets.

3. The system of claim 2, wherein:
setting respective architectural features comprises hyperparameter tuning; and
selecting a candidate data model comprises selecting the candidate data model based on a hyperparameter.

4. The system of claim 3, wherein the hyperparameter is a number of neural network layers.

5. The system of claim 2, wherein the candidate data models comprise at least one of a generative adversarial model or a long short-term memory model.

6. The system of claim 2, wherein:
training individual ones of the candidate data models terminates when a training criterion is satisfied; and
training the selected data-model terminates when the training criterion is satisfied.

7. The system of claim 1, wherein processing the test data-model output comprises implementing the encoding method, the encoding method comprising performing principle component analysis.

8. The system of claim 1, wherein processing the test activation function values comprises implementing the encoding method, the encoding method comprising using an autoencoder model to reduce the number of dimensions of the test activation function values.

9. The system of claim 1, wherein processing the test activation function values comprises implementing the factorizing method, the factorizing method comprising performing non-negative matrix factorization.

10. The system of claim 1, wherein processing the test activation function values comprises implementing the vectorizing method, the vectorizing method comprising appending rows of a dataset.

11. The system of claim 1, wherein the similarity metric comprises at least one of a correlation between the reference activation function values and the processed activation function values, a difference between a statistical measure of the reference activation function values and the processed activation function values, or a regression result describing a relationship between the reference activation function values and the processed activation function values.

12. The system of claim 1, wherein the data model comprises at least one of a generative adversarial model, a neural network model, or a long-short term neural network model.

13. The system of claim 1, wherein the data model is configured to generate synthetic data.

14. The system of claim 1, the operations further comprising updating the dataset index based on the test activation function values.

15. The system of claim 1, wherein the test dataset comprises image data.

16. The system of claim 1, wherein receiving the test dataset comprises receiving the test dataset at a cloud system.

17. A method for searching datasets, the method comprising:
- receiving a test dataset from a client device;
- generating, using a data model, test activation function values based on a test dataset, the test activation function values corresponding to nodes of the data model and determining whether the corresponding nodes fire;
- processing the test activation function values, the processing comprising implementing at least one of an encoding method,
- a factorizing method, or a vectorizing method on the distribution of test activation function values;
- retrieving reference activation function values from a dataset index;
- generating a similarity metric based on the reference activation function values and the processed test activation function values;
- classifying the test dataset based on the similarity metric;
- updating the dataset index based on the test data-model output; and
- transmitting, to the client device, information comprising the classification of the test dataset.

18. A system for searching datasets, comprising:
- one or more memory units storing instructions; and
- one or more processors that execute the instructions to perform operations comprising:
  - receiving a plurality of input datasets;
  - generating a plurality of candidate data-models corresponding to the input datasets;
  - training the candidate data-models to generate synthetic data based on the corresponding input datasets, the training comprising setting respective architectural features of the candidate data-models;
  - selecting a trained data-model based on the respective architectural features;
  - training the selected data-model to generate synthetic data based on the input datasets;
  - generating, using a data model, test activation function values based on a test dataset, the test activation function values corresponding to nodes of the data model and determining whether the corresponding nodes fire;
  - processing the reference activation function values, the processing comprising implementing at least one of an encoding method, a factorizing method, or a vectorizing method on the reference activation function values;
  - storing processed reference activation function values output in a dataset index;
  - receiving a test dataset from a client device;
  - generating test activation function values output using the selected data-model, based on the test dataset;
  - processing the test activation function values, the processing comprising at least one of implementing an encoding method, a factorizing method, or a vectorizing method on the test activation function values;
  - retrieving the processed reference activation function values from the dataset index;
  - generating a similarity metric based on the processed reference activation function values and the processed test activation function values;
  - classifying the test dataset based on the similarity metric;
  - updating the dataset index based on the processed activation function values; and
  - transmitting, to the client device, information comprising the classification of the test dataset.

* * * * *